United States Patent [19]

Maru et al.

[11] Patent Number: 4,530,887
[45] Date of Patent: Jul. 23, 1985

[54] FUEL CELL SYSTEM WITH ELECTROLYTE CONSERVATION AND/OR REPLENISHMENT

[75] Inventors: Hansraj C. Maru, Brookfield; Mohammad Farooque, Huntington, both of Conn.

[73] Assignee: Energy Research Corporation, Danbury, Conn.

[21] Appl. No.: 617,900

[22] Filed: Jun. 6, 1984

[51] Int. Cl.$^3$ .............................................. H01M 8/14
[52] U.S. Cl. ........................................ 429/16; 429/13; 429/45
[58] Field of Search ..................... 429/13, 14, 16, 45, 429/8

[56] References Cited

U.S. PATENT DOCUMENTS

| 3,634,139 | 1/1972 | Reiser | 136/86 R |
| 4,038,643 | 7/1977 | Lamarine et al. | 429/44 |
| 4,383,008 | 5/1983 | Chi | 429/38 |
| 4,414,291 | 11/1983 | Breault | 429/14 |

Primary Examiner—Charles F. LeFevour

[57] ABSTRACT

A fuel cell system (1) and method wherein a gas passage means (3b) is disposed adjacent an electrode (3a) of a fuel cell (2) and process gas (8) is provided to the gas passage means (3b), the process gas being at a preselected temperature and including a preselected amount of a preselected constituent, said temperature, constituent and amount of constituent being selected to inhibit or retard electrolyte from being carried from the fuel cell (2) and/or to compensate for loss of electrolyte through other means in the cell (2) as the gas traverses the gas passage means (3b).

32 Claims, 2 Drawing Figures

FUEL CELL SYSTEM WITH ELECTROLYTE CONSERVATION AND/OR REPLENISHMENT

BACKGROUND OF THE INVENTION

This invention pertains to fuel cell systems and, in particular, to fuel cell systems adapted to inhibit electyrolyte loss.

In the operation of fuel cells, it is usual that the fuel cell will lose electrolyte due to the large volume of process gases which contact the electrolyte during fuel cell operation. Electrolyte may also be lost via other mechanisms, such as reactions with cell components, corrosion and creepage. This occurrence of electrolyte loss has resulted in a variety of techniques for replenishing lost electrolyte. In these techniques electrolyte is usually supplied to the fuel cell by introducing fresh electrolyte from an electrolyte supply.

U.S. Pat. No. 3,634,139 discloses one system wherein internal pools coupled to an external reservoir serve as the electrolyte supply. In U.S. Pat. No. 4,038,463, a layer adjacent the catalyst layer of a fuel cell electrode is used as an electrolyte reservoir and forms the electrolyte supply. Finally, in U.S. patent application Ser. No. 327,970, assigned to the same assignee hereof, electrolyte is stored in electrode channels adjacent the fuel cell electrolyte matrix and electrolyte may be added periodically to the cell to fill the channels.

While these procedures have provided some degree of success in maintaining fuel cell electrolyte levels, research is still being conducted to develop alternative techniques.

It is an object of the present invention to provide a fuel cell system and method adapted to suppress or inhibit electrolyte loss.

It is a further object of the present invention to provide a fuel cell system and method adapted to replenish electrolyte lost by the cell.

SUMMARY OF THE INVENTION

In accordance with the principles of the present invention, the above and other objectives are realized in a practice wherein a gas passage means is disposed adjacent an electrode of a fuel cell and process gas is provided to the gas passage means, the process gas being at a preselected temperature and including a preselected amount of preselected constituent, the temperature, constituent and amount of constituent being selected to inhibit or retard electrolyte from being carried from the fuel cell and/or to add electrolyte to the fuel cell as the gas traverses the gas passage means.

In one embodiment of the invention to be disclosed hereinafter, a further gas passage means is disposed adjacent a further fuel cell electrode and a further process gas is provided to this further passage means, this further process gas also being at a temperature and including an amount of constituent so as to inhibit or retard electrolyte from being carried from the cell and/or to add electrolyte to the cell.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
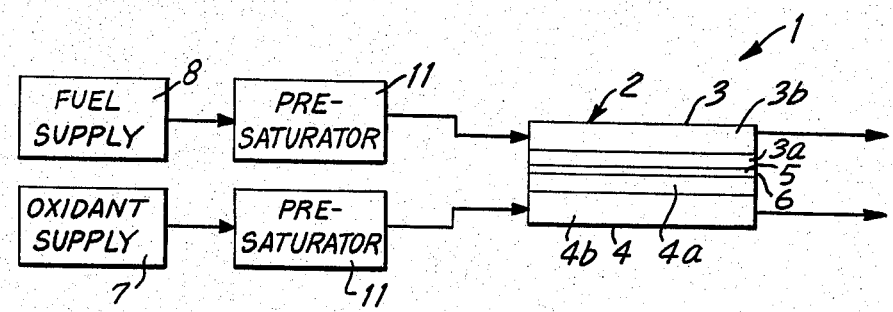
FIG. 1 shows a first embodiment of a fuel cell system in accordance with the principles of the present invention.

In FIG. 1, a fuel cell system 1 comprises a fuel cell 2 having an anode section 3 and a cathode section 4. The sections 3 and 4 together sandwich an electrolyte 5, the latter preferably being held in a matrix 6.

The anode section 3 includes an anode electrode 3a which borders the electrolyte matrix 6 and a gas passage 3b which is adjacent the electrode 3a and which carries anode or fuel process gas through the cell. The cathode section 4 includes like components, i.e., a cathode electrode 4a and an adjacent gas passage 4b for carrying oxidant or cathode process gas through the cell. Oxidant gas is supplied to the passage 4b via an oxidant supply 7 and anode or fuel gas is supplied to the passage 3b via a fuel supply 8.

Cooling may be provided for the cell 2 via excess flow of the process gases or via other cooling techniques known in the art. The design of the passages 3b and 4b and the design of the cooling means is such as to result in a predetermined average operating temperature for the cell.

In passing through the cell, the fuel and oxidant process gases pick up electrolyte vapor. This electrolyte vapor is carried from the cell as the process gases exit same, resulting in electrolyte loss.

The amount of electrolyte vapor normally picked up by a process gas in passing in normal fashion through a fuel cell defines a saturation temperature $T_s$ for that gas. The saturation temperature is the temperature at which the electrolyte vapor in the gas will just begin to condense. In a typical phosphoric acid fuel cell having entry and exit temperature of 300° F. and 350° F., respectively, the saturation temperature for the exiting oxidant process gas and for the exiting fuel process gas might be 345°-350° F. depending upon the extent of equilibration.

In accordance with the invention, the fuel cell system 1 is further adapted to reduce the aforementioned electrolyte loss. This is accomplished by causing the process gas provided to at least one of the passages 3b and 4b to be at a preselected temperature and to include a preselected amount of preselected constituent. More particularly, the preselected temperature, the constituent and its amount are selected so as to inhibit the tendency of the electrolyte to carry electrolyte vapor from the cell. In the present case of FIG. 1, the process gas provided to each of the passages 3b and 4b is adapted in this manner.

Preferably, each of the supplies 7 and 8 is adapted to supply its respective gas at a temperature equal to or above the aforementioned saturation temperature $T_s$ for that gas. Futhermore, a presaturator 11 is included between each supply and its respective passage for adding the preselected constituent to the supply gas in an amount which totally saturates the gas at the gas saturation temperature $T_s$. The preselected constituent supplied by the presaturators 11 and the manner of saturating the gases is dependent upon the nature of the fuel cell 2.

More particularly, the constituent in general will be determined by the type of electrolyte (i.e., alkaline or acidic) used in the cell. If the electrolyte is alkaline the constituent should include cation components of the alkaline electrolyte. Thus, for example, in a molten carbonate type cell employing a mixture of alkali carbonates (lithium, potassium and sodium carbonates) as the electrolyte, the constituent might include alkali metal vapor, alkali metal carbonate, alkali metal oxide or alkali metal hydroxide. On the other hand, if the electrolyte is acidic, the constituent should include anion components of the acid electrolyte. Thus, for example, in a cell employing phosphoric acid as the electrolyte, the constituent might include the oxides of phosphorous, for example, $P_2O_5$ (sublimes at 300° C.), $P_2PO_3$ (boils at about 175° C.), $P_2O_4$, etc.

For the above-mentioned phosphoric acid type cell, a variety of presaturating procedures might be used. Thus, each presaturator 11 might function to bubble its respective received gas through a phosphoric acid bath. Alternatively, the received gas might be passed through a bed such as, for example, a bed of carbon paper, saturated with phosphoric acid. In the latter case, the bed could be periodically rejuvenated by externally adding acid and is advantageous in that it provides a high surface area for presaturation.

Another way that the presaturators 11 might operate is to inject phosphoric acid directly into the received gas streams. Yet another mode of operation might be to pass the gas over phosphorous pentoxide. By properly controlling the sublimation rate of the latter via control variables such as temperature, exposed surface area, vapor releasing port openings, etc., the proper saturation can be realized. A further mode of operation might be to pass the gas over other oxides of phosphorus ($P_2O_3$, $P_2O_4$, etc.). In this case by properly controlling the vaporization or the boiling rate of the oxide or oxides via control variables such as, temperature, exposed surface area, total heat supply, etc., the desired saturation can be attained.

In the case of other acids or alkaline electrolytes, similar techniques as described above or standard techniques can be used to realize the desired saturation via presaturators 11. In this regard, it might also be noted that the presaturators need not be situated as shown in FIG. 1. Instead they might be placed inside the conduits serving the cell as, for example, on the input manifold walls.

Figure 2:
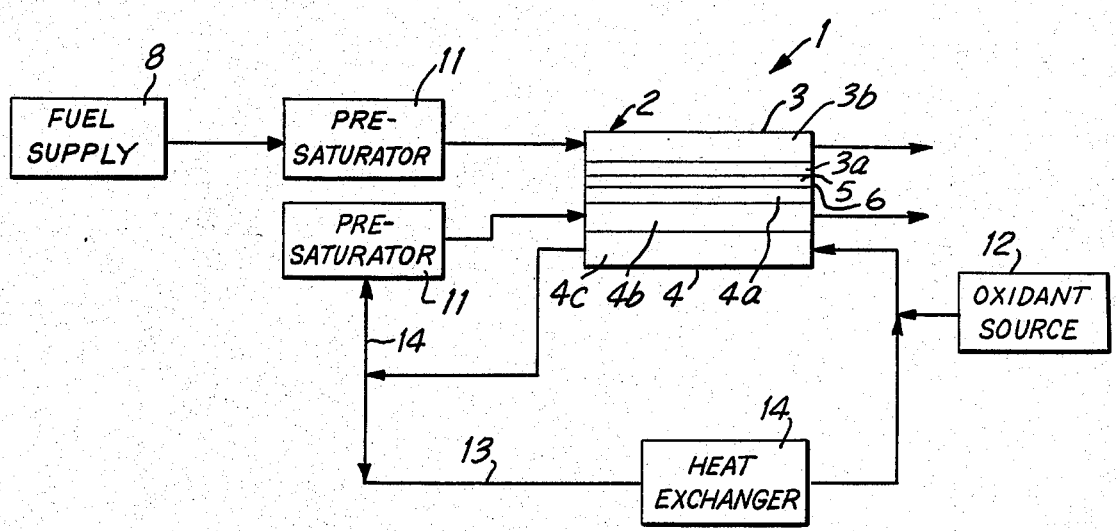
FIG. 2 illustrates a second embodiment of a fuel cell system in accordance with the principles of the present invention.

FIG. 2 shows a second embodiment of the present invention in which the supply for the cathode section 4 is derived from oxidant process gas which has been heated by passing same through the cell for cooling purposes. Thus, in this case, the cell 2 is further provided with a cooling passage 4c adjacent the passage 4b. The passage 4c receives fresh oxidant gas from a source 12, as well as recirculated oxidant gas which has been substantially reduced in temperature by a heat exchanger 14 included in the recirculation line. The heated gas from the chamber 4c is split between the latter line and a conduit 15 which feeds a portion of the heated gas to the presaturator 11 which then feeds saturated heated oxidant process gas to the passage 4b. With this arrangement, heating of the process gas and cooling of the cell occur simultaneously and the heated process gas is coupled to the process gas channel without substantial temperature reduction and, hence, substantially at the cell operating temperature. The need for a separate heater is thus avoided. The FIG. 2 arrangement for utilizing the heated cooling gas directly as process gas is further disclosed in copending application Ser. No. 06/507,071, filed June 23, 1983 and assigned to the same assignee hereof.

While in the above-described preferred arrangemehts, total saturation of one or both of the input process gases is carried out at the saturation temperature, it is also within the contemplation of the invention to oversaturate with respect to the saturation temperature $T_s$ one of the gases with an electrolyte constituent. This can be accomplished, for example, by increasing the temperature of the gas above the saturation temperature $T_s$ and adding constituent in an amount greater than that required to totally saturate the gas at the temperature $T_s$. In this case, when the oversaturated gas enters the cell and its temperature is reduced to the saturation temperature $T_s$, the electrolyte added beyond that required for total saturation at the temperature $T_s$ condenses in the cell. As a result, electrolyte is added to the cell and partially or totally compensates for the electrolyte being lost through the other gas stream or by other cell effects, such as, creepage or corrosion. Furthermore, if the fuel supply is creating the fuel gas by a reforming reaction, the reformed fuel gas will usually be above the fuel gas saturation temperature, so that the fuel gas can be the one that is oversaturated with the electrolyte constituent. By ensuring, that sufficient acid is condensed from the oversaturated fuel gas to completely off-set electrolyte loss from the oxidant gas and the other cell effects, supplying presaturated electrolyte to the oxidant gas can be dispensed with.

It should also be noted that in molten carbonate fuel cells, the higher temperature and vapor pressure of the incoming fuel gas may be such that this gas need only be presaturated to realize acceptable retardation of electrolyte loss.

In all cases, it is understood that the above-described arrangements are merely illustrative of the many possible specific embodiments which represent applications of the present invention. Numerous and varied other arrangements can be readily devised without departing from the spirit and scope of the invention.

What we claim is:

1. A fuel cell system comprising:
   a fuel cell operating at a predetermined temperature and including: an electrode adapted to communicate with an electrolyte; and a passage means for carrying a process gas through said cell in communication with said electrode;
   and means for providing said process gas to said passage means at a preselected temperature, said process gas including a preselected amount of a preselected constituent, said temperature, constituent and amount of constituent being selected to retard electrolyte from being carried from said cell when said gas traverses said cell through said passage means.

2. A fuel cell system in accordance with claim 1 wherein:
   said electrode is an anode electrode;
   and said process gas is a fuel gas.

3. A fuel cell system in accordance with claim 1 wherein:
   said electrode is a cathode electrode;
   and said process gas is an oxidant gas.

4. A fuel cell system in accordance with claim 1 wherein:
   said electrode is an anode electrode;
   said process gas is fuel gas;

said fuel cell further comprises: a cathode electrode adapted to communicate with said electrolyte; and a further passage means for carrying oxidant process gas through said cell in communication with said cathode electrode;

and said system further includes: means for providing said oxidant process gas to said further passage means at a further preselected temperature, said oxidant process gas including a further preselected amount of said preselected constituent, said further temperature and further amount being selected to retard electrolyte from being carried from said cell when said oxidant process gas traverses said further passage means.

5. A fuel cell system in accordance with claim 1 wherein:
said constituent comprises a component of said electrolyte.

6. A fuel cell system in accordance with claim 5 wherein:
said constituent is in vapor form.

7. A fuel cell system in accordance with claim 5 wherein:
said electrolyte is an alkaline electrolyte;
and said constituent contains cations of said electrolyte.

8. A fuel cell system in accordance with claim 7 wherein:
said electrolyte is an alkali carbonate;
and said constituent comprises one of an alkali metal, alkali hydroxide and an alkali carbonate.

9. A fuel cell system in accordance with claim 5 wherein:
said electrolyte is an acid electrolyte;
and said constituent contains anions of said electrolyte.

10. A fuel cell system in accordance with claim 9 wherein:
said electrolyte is phosphoric acid;
and said constituent comprises an oxide of phosphorus.

11. A fuel cell system in accordance with claim 1 wherein:
said temperature and amount of constituent is such that a portion of said constituent condenses from said process gas when passing through said cell.

12. A fuel cell system in accordance with claim 11 wherein:
said portion of condensed constituent substantially equals the amount of electrolyte being lost by said cell.

13. A fuel cell system in accordance with claim 1 wherein:
said means for providing provides said process gas at or above the saturation temperature of said gas and includes: means for adding said preselected amount of constituent.

14. A fuel cell system in accordance with claim 13 wherein:
said temperature of said process gas is above said saturation temperature;
said said means for adding adds said constituent in an amount greater than that which would totally saturate, said gas at said saturation temperature.

15. A fuel cell system in accordance with claim 14 wherein:
said means for providing further includes: a further passage means in communication with a heat generating surface of said fuel cell for receiving said process gas; and means for coupling a portion of the process gas exiting said further passage means to said means for adding.

16. A fuel cell system in accordance with claim 13 wherein:
said preselected amount of process gas totally saturates said gas at said saturation temperature.

17. A method for use with a fuel cell system comprising the steps of:
operating a fuel cell at a predetermined temperature;
providing process gas to a passage means which is in communication with an electrode of the fuel cell, said electrode being adapted to communicate with an electrolyte, and said process gas being at a preselected temperature and including a preselected amount of preselected constituent, said temperature, constituent and amount of constituent being selected to retard electrolyte from being carried from said cell when said gas traverses said cell through said gas passage means.

18. A method in accordance with claim 17 wherein:
said electrode is an anode electrode;
and said process gas is a fuel gas.

19. A method in accordance with claim 17 wherein:
said electrode is a cathode electrode;
and said process gas is an oxidant gas.

20. A method in accordance with claim 17 wherein:
said electrode is an anode electrode;
said process gas is fuel gas;
and said method further comprises providing an oxidant process gas to a further passage means which is in communication with a cathode electrode of said fuel cell, said cathode electrode being adapted to communicate with said electrolyte, and said oxidant process gas being at a further preselected temperature and including a further preselected amount of said constituent, said further temperature and further amount being selected to retard electrolyte from being carried from said cell when said oxidant gas traverses said cell through said further gas passage means.

21. A method in accordance with claim 20 wherein:
said constituent comprises a component of said electrolyte.

22. A method in accordance with claim 21 wherein:
said constituent is in vapor form.

23. A method in accordance with claim 21 wherein:
said electrolyte is an alkaline electrolyte;
and said constituent contains cations of said electrolyte.

24. A method in accordance with claim 23 wherein:
said electrolyte is an alkali carbonate;
and said constituent comprises one of an alkali metal, alkali hydroxide and an alklai carbonate.

25. A method in accordance with claim 21 wherein:
said electrolyte is an acid electrolyte;
and said constituent contains anions of said electrolyte.

26. A method in accordance with claim 25 wherein:
said electrolyte is phosphoric acid;
and said constituent comprises an oxide of phosphorus.

27. A method in accordance with claim 17 wherein:
said temperature and amount of constituent is such that a portion of said constituent condenses from said process gas when passing through said cell.

28. A method in accordance with claim 27 wherein:

said portion of condensed constituent substantially equals the amount of electrolyte lost by said cell.

29. A method in accordance with claim 17 wherein: said process gas is at or above the saturation temperature of said gas and said amount of constituent saturates said process gas stream at said saturation temperature.

30. A method in accordance with claim 29 wherein: said saturating of said process gas occurs one of internal and external of said cell.

31. A method in accordance with claim 29 wherein: said process gas is first passed through a further passage means in communication with a heat generating surface of said cell; and a portion of said process gas exiting said further passage means is coupled to said passage means.

32. A method in accordance with claim 17 wherein: said process gas is above the saturation temperature of said gas and said amount of constituents is greater than that which would totally saturate said gas at said saturation temperature.

* * * * *